(12) United States Patent
Yebka et al.

(10) Patent No.: US 8,268,467 B2
(45) Date of Patent: Sep. 18, 2012

(54) BATTERY SAFETY FEATURES

(75) Inventors: Bouziane Yebka, Cary, NC (US);
Joseph A. Holung, Wake Forest, NC (US); Tin-Lup Wong, Chapel Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 593 days.

(21) Appl. No.: 12/413,950

(22) Filed: Mar. 30, 2009

(65) Prior Publication Data

US 2010/0243345 A1    Sep. 30, 2010

(51) Int. Cl.
*H01M 2/12* (2006.01)
*B60K 1/00* (2006.01)
*G06F 1/26* (2006.01)

(52) U.S. Cl. .................. 429/56; 180/65.1; 713/300
(58) Field of Classification Search ............ 429/61, 429/53, 57, 161, 231.4, 231.95, 62, 7, 56; 180/65.1; 713/300
See application file for complete search history.

(56) References Cited

U.S. PATENT DOCUMENTS

| | | | | |
|---|---|---|---|---|
| 2,917,122 | A * | 12/1959 | Quisenberry | 180/210 |
| 6,037,071 | A * | 3/2000 | Poirier et al. | 429/7 |
| 6,555,263 | B1 * | 4/2003 | Kim et al. | 429/61 |
| 6,730,430 | B2 * | 5/2004 | Chang | 429/53 |
| 2003/0091901 | A1 * | 5/2003 | Kaneda et al. | 429/231.4 |
| 2006/0078787 | A1 * | 4/2006 | Sato et al. | 429/62 |
| 2006/0115713 | A1 * | 6/2006 | Kim et al. | 429/61 |
| 2008/0038627 | A1 * | 2/2008 | Yamauchi et al. | 429/53 |

* cited by examiner

*Primary Examiner* — Jonathan Crepeau
*Assistant Examiner* — Kenneth Douyette
(74) *Attorney, Agent, or Firm* — Terence & Associates LLC

(57) ABSTRACT

The invention broadly provides improved safety features for batteries utilized in electronic devices. The invention provides an improved CID design that allows for more reliable disconnection (breaking the electrical circuit) during abnormal pressure or temperature events inside the cell. The invention provides a multi-layered CID configured to force electric current through a thin, fragile element such that the thin, fragile element is broken upon any abnormal pressure and temperature event.

14 Claims, 5 Drawing Sheets

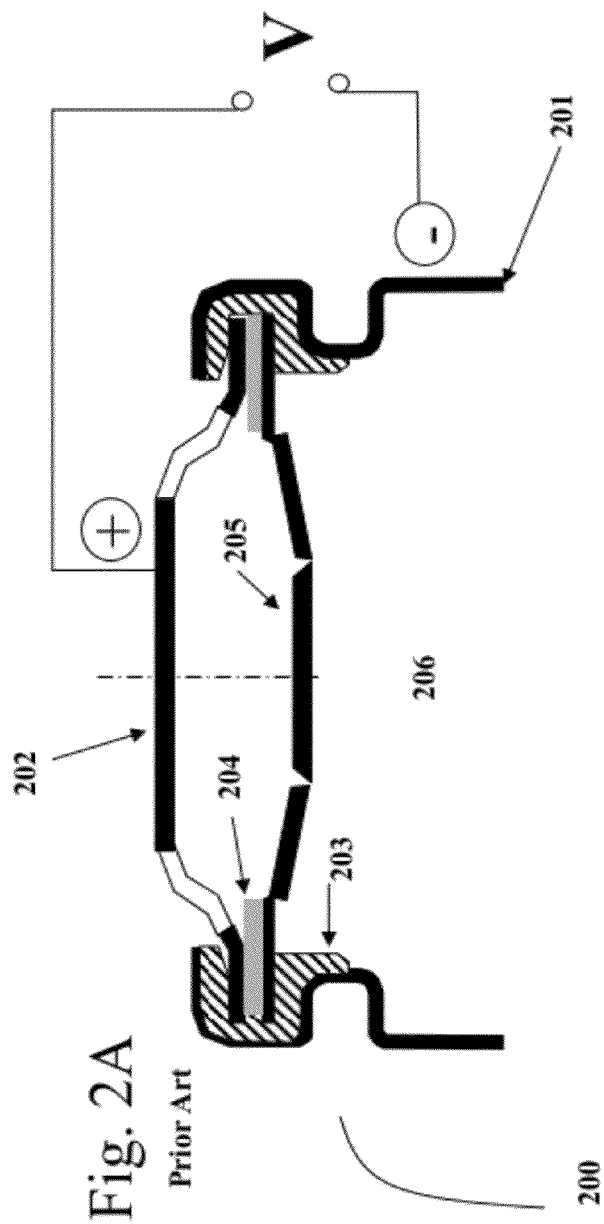
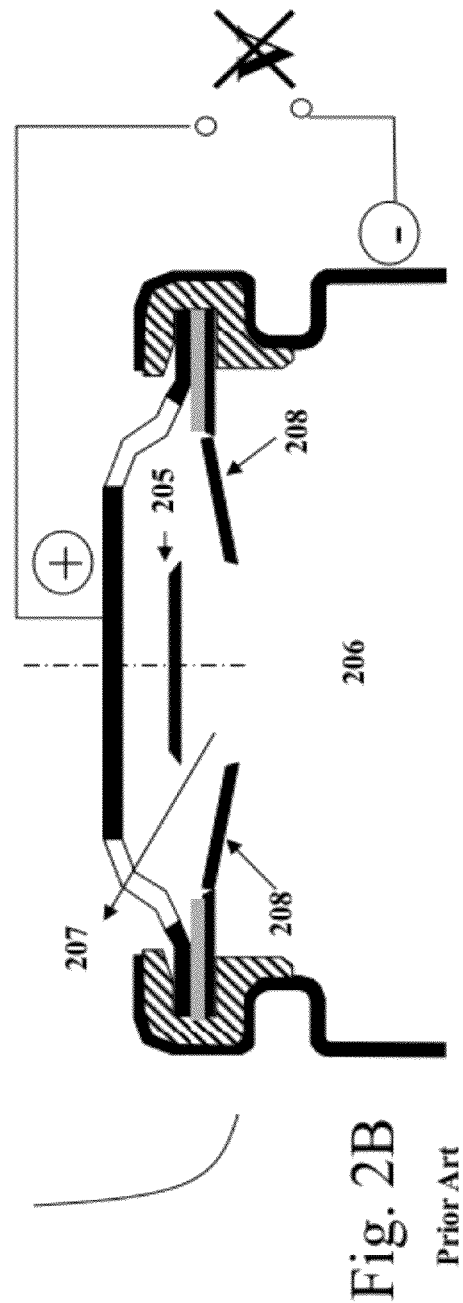
Fig. 2A
Prior Art
Fig. 2B
Prior Art

BATTERY SAFETY FEATURES

FIELD OF THE INVENTION

The invention is directed to battery safety features. More specifically, the invention is directed to improved Circuit Interrupt Devices (CID) for batteries of electronic devices.

BACKGROUND OF THE INVENTION

Batteries (e.g. rechargeable Lithium-Ion batteries) are used extensively in electronic devices (e.g. notebook computers, cell phones and other portable electronic equipment). Rechargeable Lithium-Ion batteries are presently preferred primarily because of their relatively low cost and high-energy storage capability.

The increasing pressure to package more power into a given size battery cell seems to be approaching a technology limit for some particular cylindrical cell geometry, as evidenced by an increase in safety incidents where the cell has exploded, ruptured, or vented (a forced expulsion of gases). The safety hazards from such incidents, although rare, include the potential for causing a fire and the risk of burns and other injury from projectiles and ejected cell contents. This problem has exposed some battery vendors and equipment manufacturers to unacceptable liability risks, as evidenced in a number of well-publicized recalls.

All cells currently have an internal positive temperature coefficient current limiting device (PTC). The primary role of this PTC is to limit short circuit current on individual cells. It also serves a second level of protection by acting as the CID. These devices protect the cell from excessive internal pressure. If the pressure increases beyond a set limit, the CID should break and electrically disconnect the cell. Thus, the CID is configured to open the electrical path if an excessively high charge voltage raises the internal cell pressure beyond a predetermined level (e.g. to 10 Bar (150 psi)). The safety vent allows a controlled release of gas in the event of a rapid increase in cell pressure. Unfortunately, conventional CID arrangements have proven faulty, not breaking the electrical circuit during abnormal pressure and temperature events because of an incomplete disconnect.

Accordingly, a need has arisen for more reliable safety features for batteries that address the shortcomings of the conventional arrangements discussed above.

SUMMARY OF THE INVENTION

At least one presently preferred embodiment of the invention broadly contemplates improved safety features for batteries utilized in electronic devices. The invention provides to an improved CID design that allows for more reliable disconnection of the electrical circuit during abnormal pressure or temperature events inside the cell. At least one presently preferred embodiment provides a multi-layered CID configured to force electric current through a thin, fragile element such that the thin, fragile element is broken upon any abnormal pressure and temperature event.

In summary, one aspect of the present invention provides an apparatus comprising: a battery operable device; and a battery cell which provides power to the battery operable device, the battery cell comprising: a current interrupt device configured to restrict an electric current through a fragile element configured to traverse at least one bursting disc fracture point.

Another aspect of the present invention provides an apparatus comprising: a battery cell, the battery cell comprising: a current interrupt device configured to restrict an electric current through a fragile element configured to traverse at least one bursting disc fracture point.

A further aspect of the present invention provides an apparatus comprising: a battery powered component; and a battery cell configured to provide power to the battery powered component, the battery cell comprising: a multi-layered current interrupt device having a fragile element therein configured to ensure an electric circuit is broken in response to an abnormal pressure event.

For a better understanding of the present invention, together with other and further features and advantages thereof, reference is made to the following description, taken in conjunction with the accompanying drawings, and the scope of the invention will be pointed out in the appended claims.

BRIEF DESCRIPTION OF THE DRAWINGS

FIG. 2 (A-B) illustrates a circular bursting disc design.

DETAILED DESCRIPTION OF THE PREFERRED EMBODIMENTS

Figure 1:
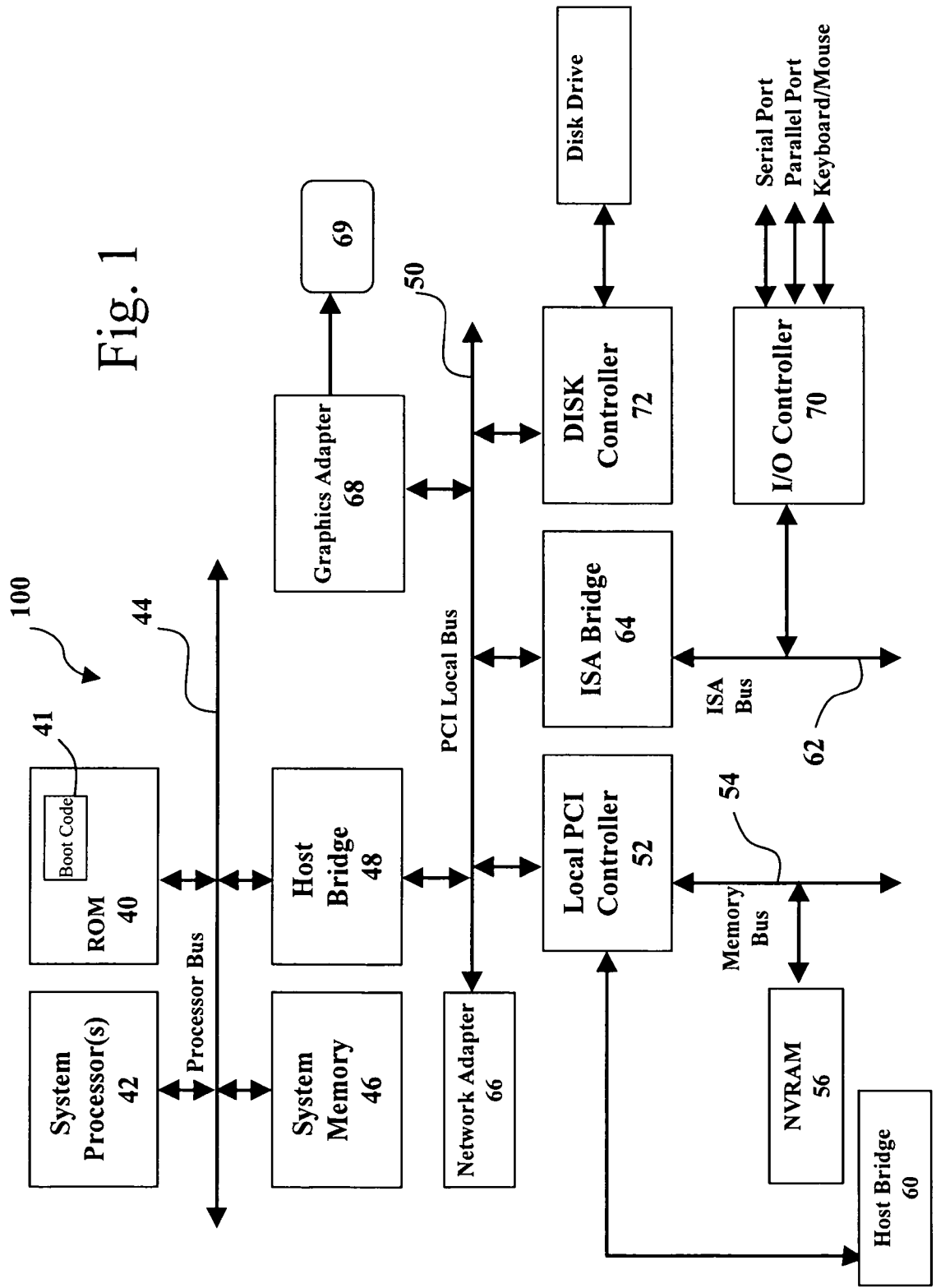
FIG. 1 is a block diagram of a computer system.

It will be readily understood that the components of the present invention, as generally described and illustrated in the figures herein, may be arranged and designed in a wide variety of different configurations in addition to the described presently preferred embodiments. Thus, the following more detailed description of the embodiments of the present invention, as represented in the figures, is not intended to limit the scope of the invention, as claimed, but is merely representative of selected presently preferred embodiments of the invention.

Reference throughout this specification to "one embodiment" or "an embodiment" (or the like) means that a particular feature, structure, or characteristic described in connection with the embodiment is included in at least one embodiment of the present invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings. The following description is intended only by way of example, and simply illustrates certain selected presently preferred embodiments of the invention as claimed herein.

As noted above, abnormal pressure and temperature events within battery cells can create problems, including safety hazards. Some useful background material regarding abnormal pressure events and gas venting techniques, as well as battery cell designs generally, is available in co-pending and commonly assigned U.S. patent application Ser. No. 12/202,314, filed on Aug. 31, 2008, which is incorporated by reference here.

Existing CIDs are designed to help prevent gas build up and break the electrical circuit within the cell should abnormal pressures and/or temperatures be encountered. Investigations and field returns, however, show faulty conventional CID operation where the electrical circuit was not broken during abnormal pressure or temperature events, i.e. where the bursting disc of the CID should have opened/broken the circuit.

Accordingly, the present invention provides, according to at least one embodiment, improved CID arrangements that reliably break the electrical circuit when necessary, thereby improving battery safety.

The invention, among other advantages, provides precise pressure response, eliminates the need for added parts inside the cell (such as additional insulation which have proven to cause additional problems during venting), and makes it easier to weld the internal electrode inside the cell (by providing a larger welding area). The invention further provides a complete electrical path disconnection when activated. The invention can be applied to any type of cells, making its use broadly applicable to many different types of batteries found in many different types of devices. The invention provides improved CID designs that, when compared with conventional arrangements, are easier and faster to implement/manufacture, more reliable, and less expensive.

The description will now refer to the figures, in which at least one presently preferred embodiment will be described in detail.

Referring now to FIG. 1, there is depicted a block diagram of an illustrative embodiment of a computer system 100 that is powered, at least in part, by a battery. The illustrative embodiment depicted in FIG. 1 may be a notebook computer system, such as one of the ThinkPad® series of personal computers sold by Lenovo (US) Inc. of Morrisville, N.C. or a workstation computer, such as the Thinkstation®, which is also sold by Lenovo (US) Inc. of Morrisville, N.C. As is apparent from the description, however, the present invention is applicable any data processing system or other electronic device that utilizes a battery as a power source (i.e. has a battery powered component), as described herein.

As shown in FIG. 1, computer system 100 includes at least one system processor 42, which is coupled to a Read-Only Memory (ROM) 40 and a system memory 46 by a processor bus 44. System processor 42, which may comprise one of the processors produced by Intel Corporation, is a general-purpose processor that executes boot code 41 stored within ROM 40 at power-on and thereafter processes data under the control of operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 100 to LAN 10, and graphics adapter 68, which interfaces computer system 100 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 100 further includes Industry Standard Architecture (ISA) bus 62, which is coupled to PCI local bus 50 by ISA bridge 64. Coupled to ISA bus 62 is an input/output (I/O) controller 70, which controls communication between computer system 100 and attached peripheral devices such as a keyboard, mouse, and a disk drive. In addition, I/O controller 70 supports external communication by computer system 100 via serial and parallel ports (e.g. to a keyboard as herein described, the keyboard being operatively coupled to the components of the system to enable a user to execute the functionality of the system). The USB Bus and USB Controller (not shown) are part of the Local PCI controller (52).

FIG. 2 (A-B) illustrates a battery cell having a circular bursting disc CID design. FIG. 2 (A-B) illustrates a side-on cross-sectional view of the top of a typical cell (200) with a bursting disc (205) surrounded by additional component material (e.g. a washer (208)).

Referring to FIG. 2A, the cylindrical portion of the can (201) is negative whereas the top of the can is a positive terminal (202). A gasket (203) serves as an insulator. The top of the can (202) is electrically connected through contact with the PTC gasket (204), the (circular metal) bursting disc (205), and the inner electrode (terminal tab or cathode lead) (206). If the temperature exceeds a predetermined amount, the PTC (204) behavior changes to that of an isolator and serves its primary role to limit current flow.

Figure 3:
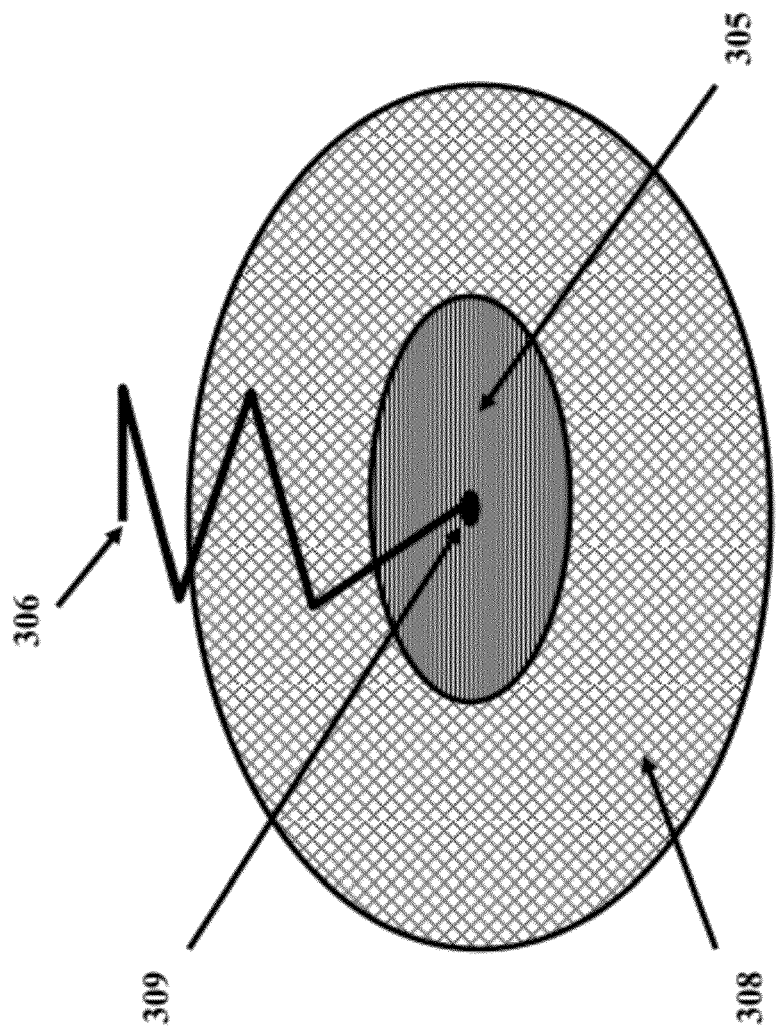
FIG. 3 illustrates a bottom view of a circular bursting disc design with an internal electrode connected.

The inner electrode (terminal tab or cathode lead) (306) is welded to the underside of bursting disc (305) at a central dimple (309), as shown in FIG. 3. The bursting disc (305) and associated outer component (308) make up the central portion of the CID design, as shown. The design shown requires welding to the central dimple (309). Requiring welding to such a small, critical area within the cell has caused problems in past in both manufacturing/assembly and in operation.

If pressure increases above a predetermined amount, i.e. an abnormal and/or dangerous amount, the bursting disc (205) is designed to burst completely, as shown in FIG. 2B, letting gas can escape through openings (e.g. opening (207)) and thereby reducing internal cell pressure. When the metal bursting disc (205) bursts, the circuit is also open/broken and the secondary role of CID operation is obtained (i.e. the circuit breaking function).

Unfortunately, it has been observed over time that the use of such a bursting disk design encounters problems. The problems arise due to welding difficulties (the inner electrode (306) must be welded to the central dimple (309) on the bursting disc (305)) and the fact that, contrary to the intended design, the bursting disc (205) sometimes does not completely separate from surrounding component (208), leaving an electrical connection intact. When the bursting disc does not completely separate from surrounding (metal) component (208), the circuit will not be opened/broken and this creates a safety hazard. Adding insulation to an area underneath the central portion of the CID in an attempt to prevent the electrical circuit from being completed in the event of an incomplete disk burst is one solution. However, it has become apparent, because of the increases in power in the cells, that using insulation in these areas is not a viable solution, as often the CID becomes clogged with the additional insulation. Thus, additional insulation is an inadequate solution to the problem presented by an incomplete burst of the bursting disk.

Accordingly, at least one embodiment of the instant invention provides an improved CID design that ensures the circuit will be open/broke upon reaching a predetermined pressure (e.g. corresponding to when the bursting disc (205) is set to burst).

The improved CID design is illustrated in FIG. 4 (A-B), in which the bursting disc (205) and PTC (204) is replaced with a multi-layered CID design. Notably, the bursting disc (405)

can remain relatively unchanged from that illustrated in FIGS. 2-3. However, the CID is configured as a multi-layered component, offering distinct advantages over conventional CID arrangements.

According to one embodiment of the invention, a bottom conducting layer (400), including the bursting disc (405), is provided. The bottom conducting layer (400) has a thin insulting layer (412) (e.g. Kapton tape) placed on the top surface. The hole (411) on the inside diameter of the thin insulating layer (412) is larger than the bursting disc (405) of the bottom conducting layer, thus allowing the bursting disc (405) to burst upwards in response to a predetermined internal cell pressure.

A middle conductive layer (413) is placed on the top of the thin insulating layer (412). A smaller auxiliary hole (416) in the thin insulating layer (412) permits electrical continuity between the bottom conductive layer (disc) (400) and the middle conductive layer (413). The middle conductive layer is preferably a thin metal (such as copper) film having good electrical conductivity. The middle conductive layer is preferably thin, making it fragile and subject to breaking by the bursting disc.

This thin middle conductive layer (413) is configured such that a narrow and fragile element (413b) is provided. The narrow and fragile ligament (413b) extends across the bursting disc (405) (located just below when layers are assembled on top of one another). Thus, even if the bursting disc (405) is only partially opened (i.e. incompletely bursts), this fragile element (413b) will break and the circuit will be open/broken.

Figure 4A:
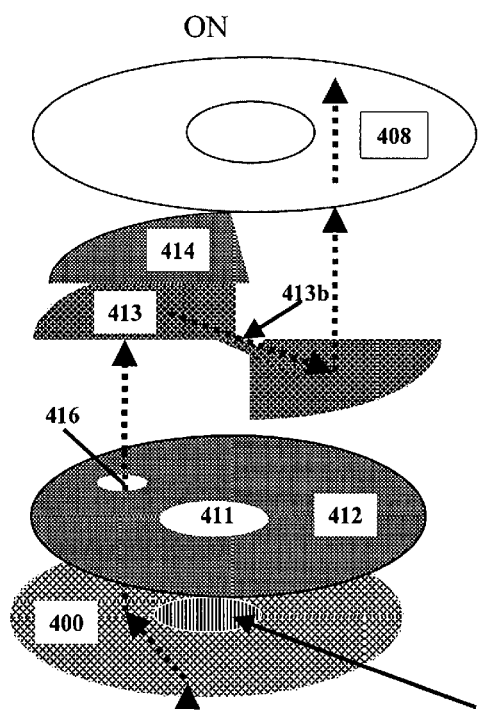
FIG. 4 (A-B) illustrates a multi-layered CID design.
Figure 4B:
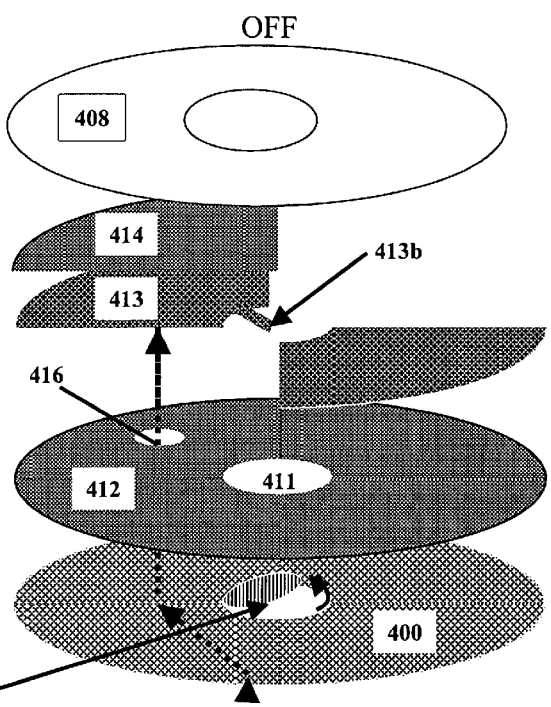

An additional top conductive layer (408) (connecting to the PTC (204)) is separated electrically from the middle conductive layer (413) by a second insulating layer (414). This is second insulating layer (414) separates the middle conductive layer (413) from the top conductive layer (408) on one side of the fragile element (413b), as shown. This arrangement restricts the electric current through the fragile element (413b). The dashed arrows on FIG. 4A-B show the path of electric current through the multi-layered CID. The path of the electric current illustrates how this multi-layered CID will open the circuit even if the bursting disc only partially bursts.

As can be seen from the path of the electric current in FIG. 4A, the electric current is forced through the fragile element (413b) by the selective placement of the insulating layers (412, 414) in order to complete the circuit (i.e. reach the PTC (204)). Thus, the fragile element (413b) is configured to traverse at least one point located at a bursting disc fracture area (described further below in connection with FIG. 5). As shown in FIG. 4B, after the bursting disc has burst, even if only partially, the fragile element (413b) will be broken, thus the electric current will be prevented from reaching the top conductive layer (408) and ultimately the battery terminal (202).

Furthermore, in this design, the inner electrode (206) can now be welded anywhere to the bottom of the CID so long as it is able to make contact with the bottom conducting layer (400), rather than only at the central dimple (309) of the bursting disk (305). The use of additional insulation arrangements and precise placement of the internal electrode (306) is thus no longer necessary to prevent electrical connection when faced with an incompletely burst disc.

Figure 5:
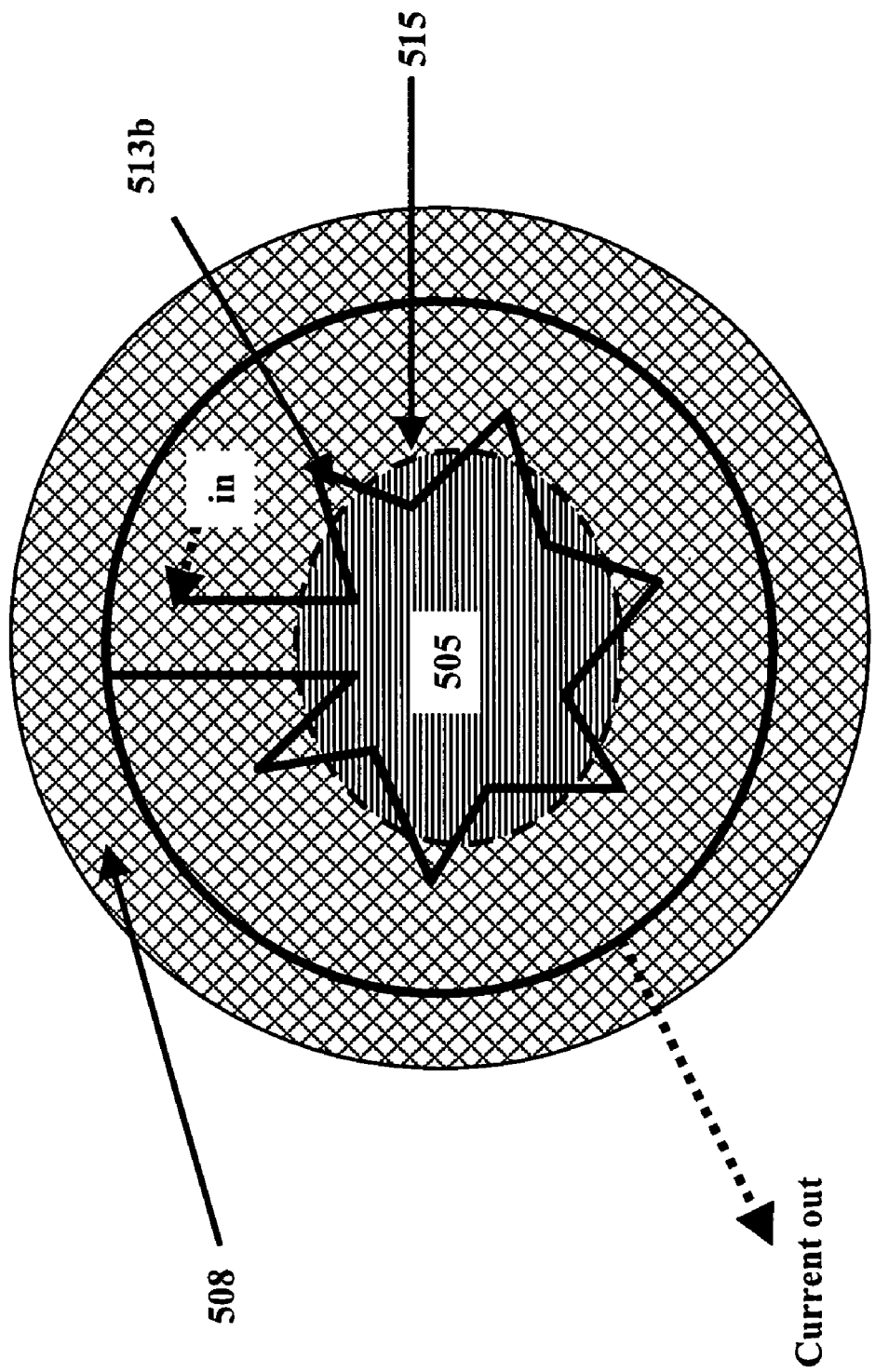
FIG. 5 illustrates a top view of a fragile element traversing the bursting disc fracture area at multiple points.

A number of alternative embodiments can be envisioned for configuring the thin conductive layer (413) to ensure the circuit is opened upon any disc burst. FIG. 5 shows, for example, a top view of an improved geometric pattern for the fragile element (513b). Instead of a single traversing fragile element (513b) that traverses the bursting disc fracture area at two points, an elongated fragile element (513b) can be utilized. The elongated fragile element (513b) traverses across the bursting disc (505) at the fracture area (515) multiple times, thereby increasing the operational reliability of the CID device. In other words, having the fragile element (513b) traverse the bursting disc fracture area (515) at multiple points (14 as shown) (and thereby restricting the current to this circuitous path) increases the probability of having the circuit broken upon any disc burst (even partial/incomplete bursts) to a near certainty. Other like embodiments are possible and fall within the scope of the claimed invention.

It should be noted that the dashed arrow shows the current flow direction through the fragile element (513b) in FIG. 5. As can be appreciated, the internal electrode (306) can be placed anywhere on the CID such that it electrically connects with the fragile element (513b), e.g. welded anywhere on the bottom conducting layer (400) that electrically connects to the middle conductive layer (413) via the auxiliary hole (416).

In brief recapitulation, at least one presently preferred embodiment of the invention provides improved safety features for batteries utilized in electronic devices. The invention provides an improved CID design that allows for more reliable disconnection of the electrical circuit during abnormal pressure or temperature events inside the cell. The invention utilizes a fragile element that traverses the bursting disc fracture area to ensure the electrical circuit is opened upon any disc burst, including incomplete disc bursts.

It should be understood and appreciated that battery cells, as discussed and broadly contemplated herein, can be employed in any of a very wide variety of operating environments, including computers, cell phones, other mobile devices (such as battery-operated power drills, saws, mowers and weed cutters). Thus, while FIG. 1 presents a computer system by way of a possible operating environment for a battery cell having a CID design as described herein in accordance with an embodiment of the present invention, it of course should be understood that this is provided by way of merely an illustrative and non-restrictive example. Battery cells, as such, can act to power a load device or other item that is configured for being battery powered. In the case of a computer, a batter cell can serve to power various components including a main memory while in the case of an automobile a battery cell can serve to power an electric motor which propels motion in the automobile.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

In the drawings and specification there has been set forth a preferred embodiment of the invention and, although specific terms are used, the description thus given uses terminology in a generic and descriptive sense only and not for purposes of limitation.

If not otherwise stated herein, it is to be assumed that all patents, patent applications, patent publications and other publications (including web-based publications) mentioned and cited herein are hereby fully incorporated by reference herein as if set forth in their entirety.

What is claimed is:

1. An apparatus comprising:
a battery operable device; and
a battery cell which provides power to the battery operable device, the battery cell comprising:

a current interrupt device comprising insulating layers interspersed between conducting layers; said insulating layers being configured to restrict an electric current through a fragile element configured to traverse at least one bursting disc fracture point;

wherein the current interrupt device further comprises:
a bottom conducting layer;
a first insulating layer disposed on said bottom conducting layer and having a current continuity hole therein; and
a middle conducting layer disposed on said first insulating layer and beneath a second insulating layer and forming the fragile element, wherein the middle conducting layer and the bottom conducting layer are electrically connected via the current continuity hole;
said second insulating layer configured to restrict the electric current through the fragile element.

2. The apparatus according to claim 1, wherein the current interrupt device further comprises:
a top conductive layer disposed on said second insulating layer and being electrically connected to an outer terminal of the battery cell, wherein the top conducting layer and the middle conducting layer are electrically connected via the fragile element.

3. The apparatus according to claim 1, wherein the fragile element comprises a film of electrically conductive metal disposed between insulating layers.

4. The apparatus according to claim 1, wherein the insulating layers comprise insulating tape.

5. The apparatus according to claim 4, wherein the fragile element is configured such that after a bursting disc bursts at one of the plurality of bursting disc fracture points, an electric circuit is broken.

6. The apparatus according to claim 1, wherein said battery operable device comprises a physical computing device;
said physical computing device comprising a main memory;
said battery cell configured to provide power to said main memory.

7. The apparatus according to claim 1, wherein said apparatus comprises an automobile;
said battery operable device comprises an electric motor which propels motion of said automobile;
said battery cell acting to provide power to said electric motor.

8. An apparatus comprising:
a battery cell, the battery cell comprising:
a current interrupt device comprising insulating layers interspersed between conducting layers; said insulating layers being configured to restrict an electric current through a fragile element configured to traverse at least one bursting disc fracture point;
wherein the current interrupt device further comprises:
a bottom conducting layer;
a first insulating layer disposed on said bottom conducting layer and having a current continuity hole therein; and
a middle conducting layer disposed on said first insulating layer and beneath a second insulating layer and forming the fragile element, wherein the middle conducting layer and the bottom conducting layer are electrically connected via the current continuity hole;
said second insulating layer configured to restrict the electric current through the fragile element.

9. The apparatus according to claim 8, wherein the current interrupt device further comprises:
a top conductive layer disposed on said second insulating layer and being electrically connected to an outer terminal of the battery cell, wherein the top conducting layer and the middle conducting layer are electrically connected via the fragile element.

10. The apparatus according to claim 8, wherein the fragile element comprises a film of electrically conductive metal disposed between insulating layers.

11. The apparatus according to claim 8, wherein the fragile element is configured such that after a bursting disc bursts at one of the plurality of bursting disc fracture points, an electric circuit is broken.

12. The apparatus according to claim 8, wherein the fragile element is configured such that after a bursting disc bursts at one of the plurality of bursting disc fracture points, an electric circuit is broken.

13. An apparatus comprising:
a battery powered component; and
a battery cell configured to provide power to the battery powered component, the battery cell comprising:
a multi-layered current interrupt device having insulating layers interspersed between conducting layers; said insulating layers configured to restrict electric current through a fragile element configured to ensure an electric circuit is broken in response to an abnormal pressure event;
wherein the multi-layered current interrupt device further comprises:
a bottom conducting layer;
a first insulating layer disposed on said bottom conducting layer and having a current continuity hole therein; and
a middle conducting layer disposed on said first insulating layer and beneath a second insulating layer and forming the fragile element, wherein the middle conducting layer and the bottom conducting layer are electrically connected via the current continuity hole;
said second insulating layer configured to restrict the electric current through the fragile element.

14. The apparatus according to claim 13, wherein a bursting disk of the battery cell is configured to break the fragile element in response to the abnormal pressure event.

* * * * *